United States Patent
Mood et al.

(10) Patent No.: US 9,207,954 B2
(45) Date of Patent: Dec. 8, 2015

(54) CONFIGURABLE AIRCRAFT DATA ACQUISITION AND/OR TRANSMISSION SYSTEM

(71) Applicant: PRATT & WHITNEY CANADA CORP., Longueuil (CA)

(72) Inventors: James Mood, Mansfield, MA (US); Jeffrey R. Vahue, Wrentham, MA (US)

(73) Assignee: PRATT & WHITNEY CANADA CORP, Longueuil, QC (CA)

( * ) Notice: Subject to any disclaimer, the term of this patent is extended or adjusted under 35 U.S.C. 154(b) by 298 days.

(21) Appl. No.: 13/661,783

(22) Filed: Oct. 26, 2012

(65) Prior Publication Data
US 2014/0121861 A1    May 1, 2014

(51) Int. Cl.
*G06F 9/445*    (2006.01)

(52) U.S. Cl.
CPC .................................. *G06F 9/44505* (2013.01)

(58) Field of Classification Search
CPC ............ G06F 12/0815; G06F 12/0826; G06F 12/0828; G06F 12/0831; G06F 12/121; G06F 3/041; G06F 3/0416; G06F 3/048; G06F 3/0484; G06F 3/14; G06F 3/0604; G06F 3/0659; G06F 3/0673; G06F 21/52; G06F 21/54; G06F 21/60; G06F 21/73; G06F 21/75; G06F 11/27; G06F 13/1694; G06F 13/32; G06F 13/3625; G06F 13/4027; G06F 13/42; G06F 9/44505; G06F 9/30021; G06F 9/30029; G06F 9/30036; G06F 9/30094; G06F 9/30127; G06F 9/30145; G06F 9/30167; G06F 9/30181; G06F 9/3885; G06F 9/46; G06F 3/0488; G06F 3/167; G06F 17/00; G06F 17/2775; G06F 17/2795; G06F 17/28; G06F 17/30047; G06F 17/30867; G06F 17/505; G06F 19/22; G06F 1/3275; G01B 21/00; G10L 2021/02166; G10L 21/0216; G10L 15/22; G10L 15/183; G10L 15/193; G10L 15/197; G10L 21/00; H04R 1/08; H04R 3/00; H04L 63/14; H04L 2209/12; H04L 27/0012; H04L 27/01; H04L 29/06; H04L 41/0893; H04L 45/16; H04L 47/10; H04L 47/12; H04L 47/625; H04L 47/627; H04L 49/15; H04L 49/557; H04L 49/90; H04L 49/901; H04L 49/9031; H04L 49/9036; H04L 49/9047; H04L 49/9094; H04L 69/03; H04L 69/12; H04L 7/02; H04L 7/027; H04L 7/0337; H04L 9/0816; H04L 9/0861; H04L 9/0866; H04L 9/32; G06T 1/20; G06T 17/205; G06T 2207/10028; G06T 2207/30196; G06T 7/2046; G05B 15/02; G05B 11/01; G05B 2219/2642; G11C 7/22; G11C 16/10; G11C 29/56; G11C 5/145; G11C 7/1045; G11C 7/1078; G11C 7/1093; H03K 19/017581; H03K 2005/00247; H03K 3/01; H03L 7/08; H03L 7/22; H04W 48/16; H04W 12/06; H04W 16/26; H04W 24/02; H04W 24/08; H04W 24/0289; H04W 36/0016; H04W 36/0055; H04W 36/0061; H04W 36/16; H04W 40/125; H04W 4/003; H04W 4/021; H04W 52/0206; H04W 52/0212; H04W 72/0446; H04W 76/023; H04W 76/045; H04W 88/08; H04W 8/183; H04W 8/205; H04W 8/26; A61B 2560/045; A61B 7/04; A61B 8/00; A61B 8/12; A61B 8/4427; A61B 8/4455; A61B 8/4472; A61B 8/4488; A61B 8/463; A61B 8/546; A61B 8/56

See application file for complete search history.

(56) References Cited

U.S. PATENT DOCUMENTS

| | | | | |
|---|---|---|---|---|
| 5,715,163 | A * | 2/1998 | Bang et al. ................... | 701/467 |
| 6,085,147 | A * | 7/2000 | Myers ........................... | 701/528 |
| 6,134,500 | A * | 10/2000 | Tang et al. ................... | 701/528 |
| 6,148,259 | A * | 11/2000 | Hagelauer .................... | 701/122 |
| 6,163,744 | A * | 12/2000 | Onken et al. ..................... | 701/3 |
| 6,314,362 | B1 * | 11/2001 | Erzberger et al. ............. | 701/120 |
| 6,606,553 | B2 * | 8/2003 | Zobell et al. ................. | 701/120 |
| 7,039,893 | B2 * | 5/2006 | DenBraber .................. | 716/117 |

(56) References Cited

U.S. PATENT DOCUMENTS

| | | | |
|---|---|---|---|
| 7,256,710 B2* | 8/2007 | Mumaw et al. | 340/973 |
| 7,689,947 B2* | 3/2010 | Challenger et al. | 716/136 |
| 7,742,854 B2 | 6/2010 | Fussell et al. | |
| 2003/0066050 A1* | 4/2003 | Wang et al. | 717/105 |
| 2007/0169179 A1* | 7/2007 | Narad | 726/4 |
| 2008/0042923 A1* | 2/2008 | De Laet | 345/1.3 |
| 2010/0082323 A1 | 4/2010 | Fletcher et al. | |
| 2010/0323657 A1 | 12/2010 | Barnard et al. | |
| 2012/0078495 A1 | 3/2012 | Hamblin et al. | |

OTHER PUBLICATIONS

"Applicant-Proposed_claims_amendments_July_21_2015"; authored by: Alexandra Daoud; retrieved on: Jul. 21, 2015.*

* cited by examiner

*Primary Examiner* — James Trammell
*Assistant Examiner* — James E Stroud (74) *Attorney, Agent, or Firm* — Norton Rose Fulbright Canada LLP

(57) ABSTRACT

An aircraft data acquisition and/or transmission system comprises a memory having stored therein a first state machine configuration comprising a first allocation between a plurality of transition criteria objects stored in a first area of the memory and a plurality of state objects stored in a second area of the memory separate from the first area. A processor is coupled to the memory and at least one application executable by the processor causes a first data acquisition and/or transmission behavior in the aircraft by running the first state machine configuration, receives a second state machine configuration comprising a second allocation between the plurality of transition criteria objects and the plurality of state objects, and causes a second data acquisition and/or transmission behavior in the aircraft by running the second state machine configuration.

19 Claims, 9 Drawing Sheets

CONFIGURABLE AIRCRAFT DATA ACQUISITION AND/OR TRANSMISSION SYSTEM

TECHNICAL FIELD

The application relates generally to a system and method for modifying aircraft-based software.

BACKGROUND OF THE ART

Many modern aircraft systems are operated or controlled by software that is developed and approved for use in civil-certified aircraft and related systems. Such systems may be used to perform tasks such as recording aircraft operational or maintenance data, such as from engines or other aircraft systems, downloading data from other data recorders, and/or transmitting data via a cellular modem, satellite or other communications network.

Aircraft software is typically preloaded prior to aircraft delivery, and new applications often require new software releases to accommodate the mission profiles of different aircrafts and operators. As the software must be certified by civilian aviation airworthiness authorities, such as the Federal Aviation Administration (FAA), software changes are typically time consuming and costly to deploy to aircraft already in the field.

There is therefore a need for an improved system and method for modifying aircraft software.

SUMMARY

In one aspect, there is provided an aircraft data acquisition and/or transmission system comprising a memory having stored therein a first state machine configuration comprising a first allocation between a plurality of transition criteria objects stored in a first area of the memory and a plurality of state objects stored in a second area of the memory separate from the first area; a processor coupled to the memory; and at least one application executable by the processor for causing a first data acquisition and/or transmission behavior in the aircraft by running the first state machine configuration; receiving a second state machine configuration comprising a second allocation between the plurality of transition criteria objects and the plurality of state objects; and causing a second data acquisition and/or transmission behavior in the aircraft by running the second state machine configuration.

In another aspect, there is provided a computer-implemented method for aircraft data recording and transmission, the method comprising executing on a processor program code for retrieving from a memory a first state machine configuration comprising a first allocation between a plurality of transition criteria objects stored in a first area of the memory and a plurality of state objects stored in a second area of the memory separate from the first area; causing a first data acquisition and/or transmission behavior in the aircraft by running the first state machine configuration; receiving a second state machine configuration comprising a second allocation between the plurality of transition criteria objects and the plurality of state objects; and causing a second data acquisition and/or transmission behavior in the aircraft by running the second state machine configuration.

In a further aspect, there is provided a computer readable medium having stored thereon program code executable by a processor for recording and transmitting aircraft data, the program code executable for retrieving from a memory a first state machine configuration comprising a first allocation between a plurality of transition criteria objects stored in a first area of the memory and a plurality of state objects stored in a second area of the memory separate from the first area; causing a first data acquisition and/or transmission behavior in the aircraft by running the first state machine configuration; receiving a second state machine configuration comprising a second allocation between the plurality of transition criteria objects and the plurality of state objects; and causing a second data acquisition and/or transmission behavior in the aircraft by running the second state machine configuration.

DESCRIPTION OF THE DRAWINGS

Reference is now made to the accompanying figures in which:

FIG. 4b is a schematic diagram of an allocation of selected ones of the data structures of FIG. 4a;

DETAILED DESCRIPTION

Figure 1:
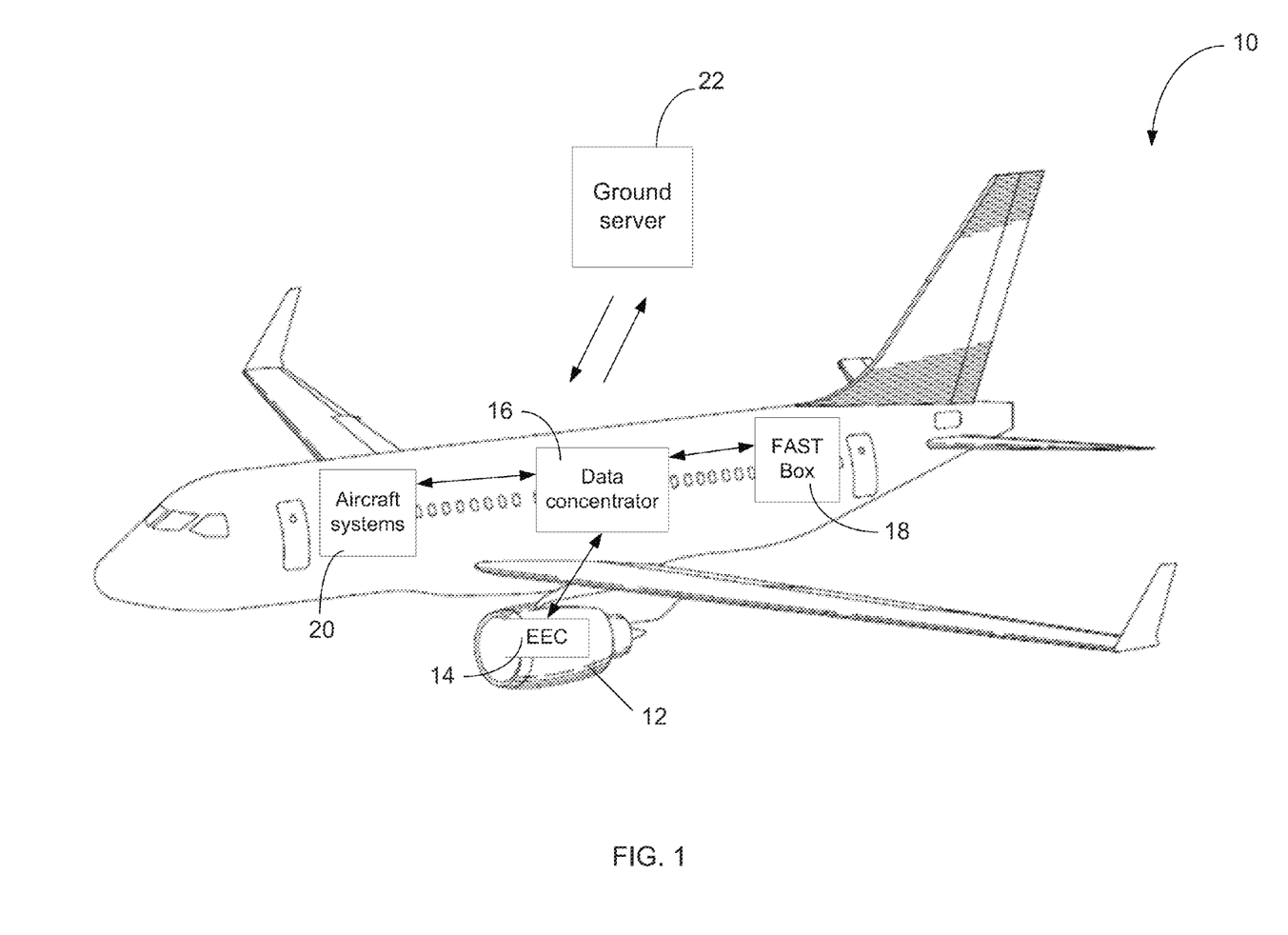
FIG. 1 is a schematic diagram of an aircraft comprising a FAST box in accordance with an illustrative embodiment.

FIG. 1 illustrates the environment of an aircraft 10 comprising a plurality of gas turbine engines 12, one of which is shown. Each engine 12 may be controlled by an Electronic Engine Control (EEC) 14. A data concentrator 16 may receive via busses (not shown) data from the EEC 14 as well as from a Flight-data Acquisition, Storage and Transmission computer or FAST box 18 and aircraft systems 20, which may comprise flight controls, electric systems, auxiliary power units, and the like. Alternatively, the data may be received directly without the data concentrator 16 being used as an intermediary. The FAST box 18 may further be operable to transmit to and receive information from a ground server 22 at least one of before, during, and after a flight. The ground server 22 may also communicate with the EEC 14 or the aircraft systems 20. The EEC FAST box 18 and data concentrator 16 illustratively include a CPU and storage (not shown).

Figure 2:
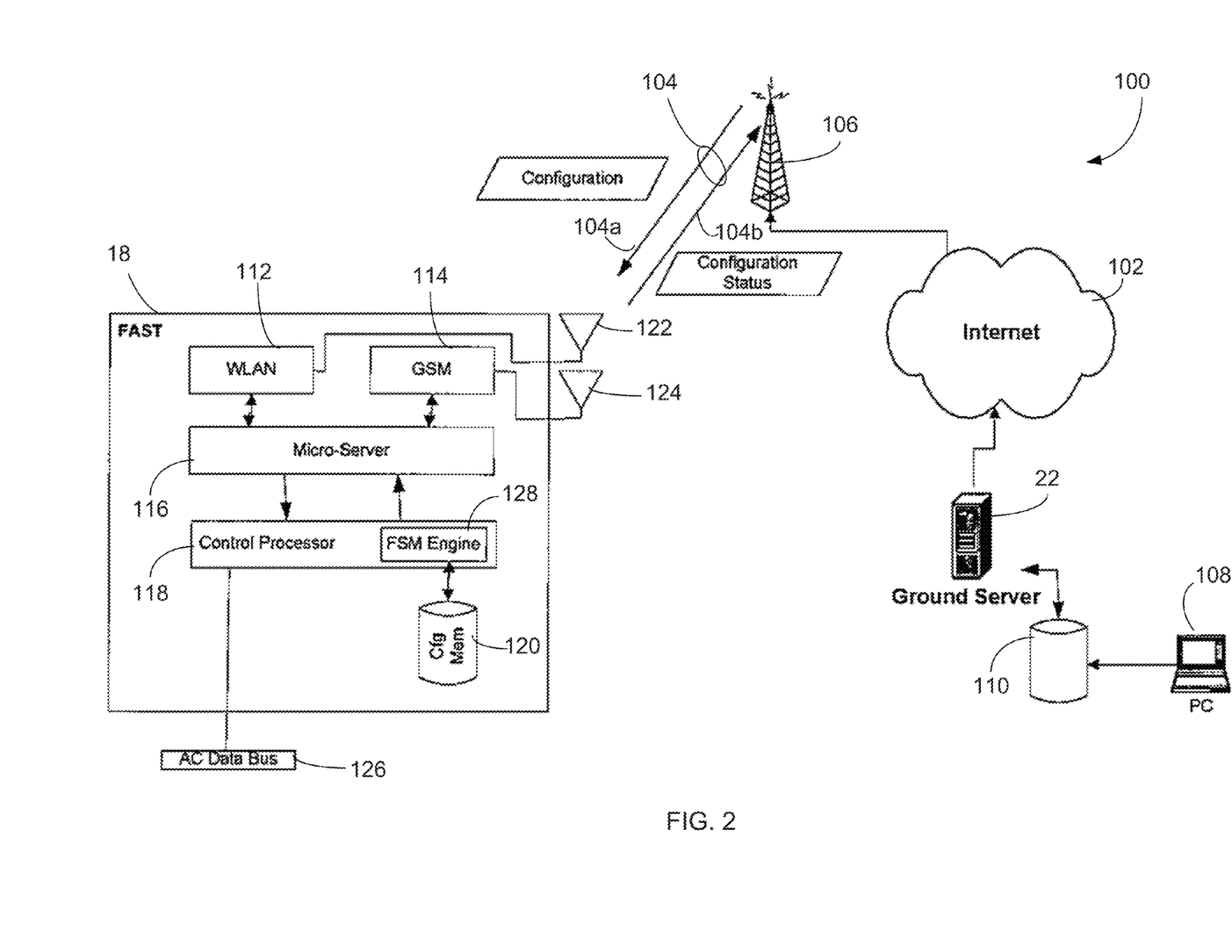
FIG. 2 is a schematic diagram of a remotely configurable data acquisition and/or transmission system in accordance with an illustrative embodiment.

Referring to FIG. 2, a remotely configurable data acquisition and/or transmission system 100 for the aircraft 10 will now be described. In the system 100, the FAST box 18 may access the ground server 22 over a network 102, such as the Internet. For this purpose, a cellular connection or communication channel 104 may be established via a base station 106 for providing access to the network 102. A client device 108, such as a computer terminal, may further be configured to access the ground server 22, and more particularly a database 110 coupled thereto for storing new finite state machine configurations, as will be discussed further below.

The database 110 described herein may be provided as collections of data or information organized for rapid search and retrieval by a computer. It is structured to facilitate storage, retrieval, modification, and deletion of data in conjunction with various data-processing operations. The database 110 may consist of a file or sets of files that can be broken down into records, each of which consists of one or more fields. Database information may be retrieved through queries using keywords and sorting commands, in order to rapidly search, rearrange, group, and select the field. The database 110 may be any organization of data on a data storage medium, such as one or more servers.

The FAST box 18 illustratively comprises a WLAN module 112, a GSM module 114, a micro-server 116, a control processor 118, and a configuration memory 120.

The configuration memory 120 may be a main memory, such as a high speed Random Access Memory (RAM), or an auxiliary storage unit, such as a hard disk, a floppy disk, or a magnetic tape drive. The configuration memory 120 may be any other type of memory, such as a Read-Only Memory (ROM), or optical storage media such as a videodisc and a compact disc.

The control processor 118 may access the configuration memory 120 to retrieve data. The control processor 118 may be any device that can perform operations on data. Examples are a central processing unit (CPU), a front-end processor, a microprocessor, and a network processor.

The WLAN module 112 and the GSM module 114 may respectively comprise a WLAN antenna 122 and a GSM antenna 124 for enabling establishment of the cellular connection 104 and optimizing free space radiation to and from the base station 106. The micro-server 116 may be in communication with the WLAN module 112 and the GSM module 114 as well as with the control processor 118 via suitable communication channels (not shown). The micro-server 116 illustratively contains non-certified software, which deals with managing the cellular connection 104 for allowing the FAST box 18 to access the network 106.

The control processor 118 may be coupled to an AC data bus 126 for receiving therethrough aircraft data indicating the status of the aircraft 10, as known to those skilled in the art. Such aircraft data may include, but is not limited to, data indicating whether the aircraft 10 is on the ground or the engine 12 is running. The aircraft data may be received at the AC data bus 126 from the data concentrator 16 or directly from the EEC 14 and the aircraft systems 20.

The control processor 118 illustratively runs certified software, which is subject to certification through an aviation authority, such as the Federal Aviation Administration (FAA). To be certified, such software has to follow guidelines laid out by standards such as the DO-178B standard from the Radio Technical Commission for Aeronautics (RTCA) or the IEC 61508 international standard. The control processor 118 may comprise a Finite State Machine (FSM) engine 128 coupled to the configuration memory 120, which may have stored therein finite state machine configurations, which may be run by the FSM engine 128 to implement a desired behavior in the FAST box 18, as will be discussed further below. For this purpose, a base finite state machine structure may be provided, which is illustratively reconfigurable to tailor the software behavior of the FAST box 18 to a plurality of applications, thus allowing to accommodate the mission profiles of different aircrafts and operators. In this manner, changing the configuration of the base finite state machine may enable activation of optional functions as well as different combinations of approved and validated components of the option-selectable software. Such changes may be effected within boundaries defined by the aerospace manufacturer without having to modify the certified software stored in the FAST box 18. The same software executable by the FSM engine 128 may indeed be used for all state machine implementations, with different state machines being implemented by changing configuration data, such as state transition object configurations and state object configurations, as will be discussed further below.

When a request is made to change or update the configuration and operation of the FAST box 18 to implement a different software behavior, the design of the finite state machine processed by the FSM engine 128, e.g. the sequence of tasks to be executed, may be modified and a new finite state machine configuration may be loaded into the configuration memory 120 remotely. For this purpose, an operator may create the new finite state machine configuration, e.g. having a modified sequence of tasks, on the computer terminal 108 and save the new configuration to the database 110 coupled to the ground server 22. The FAST box 18 may then establish the cellular connection 104 through the base station 106 and access the network 102. Using a link 104a of the communication channel 104, the FAST box 18 may then download the new finite state machine configuration from the ground server 22 and store the new finite state machine configuration in the configuration memory 120. A configuration status message, which may provide a confirmation that the download of the new configuration has been completed, may then be sent to the ground server 110 using a link 104b of the communication channel 104. The FSM engine 128 may then automatically load the new state machine configuration from the ground server database 110 into the configuration memory 120 and run the loaded state machine configuration, thus modifying the operation of the FAST box 18 accordingly. The configuration memory 120 is illustratively rewritten every time a new state machine configuration is loaded from the ground server database 110.

It should be understood that although the process of loading a new finite state machine configuration has been illustrated as being effected wirelessly, the process may also be performed using a removable medium, such as a disk or the like. Alternatively, the process may be performed manually through a wired link.

Figure 3:
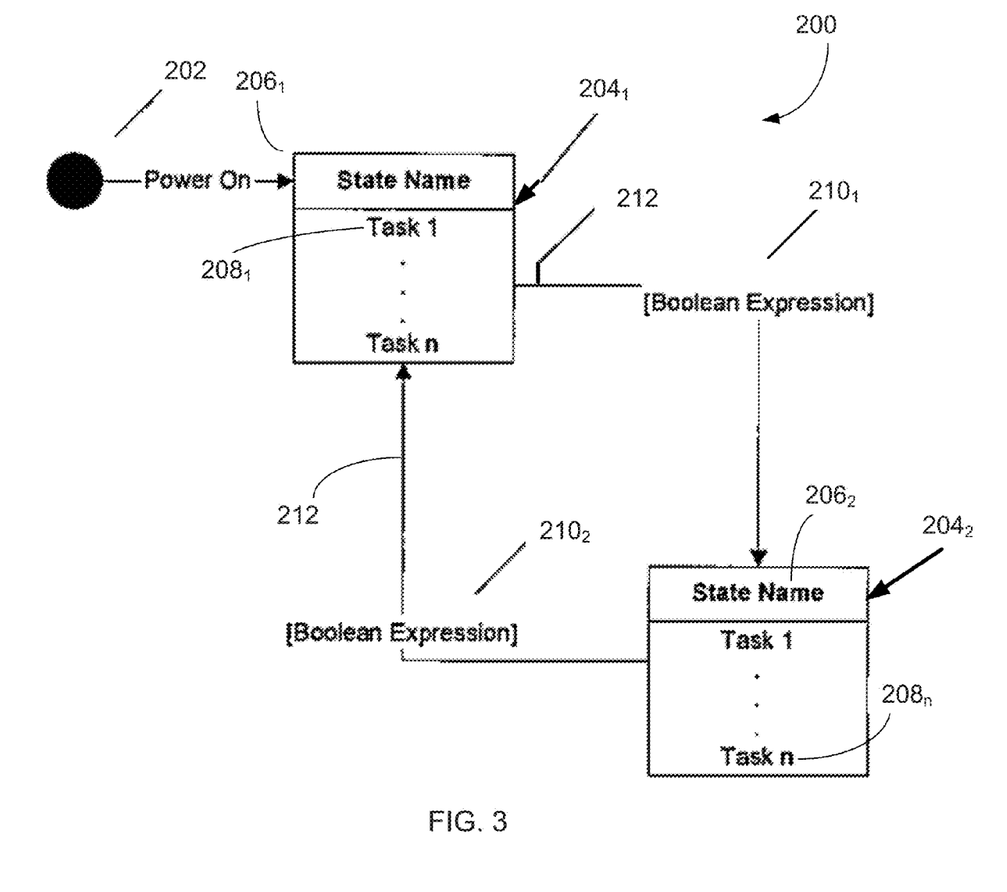
FIG. 3 is a state diagram of a reconfigurable finite state machine in accordance with an illustrative embodiment.

Referring now to FIG. 3, the base configuration 200 of the finite state machine will now be described. The finite state machine may be implemented in hardware, software, or a combination of hardware and software, as known to those skilled in the art. The finite state machine configuration 200 illustratively comprises an entry point 202, which represents the initial state when the system first powers on, and a plurality of state objects, two of which 204$_1$, 204$_2$ are illustrated. The state objects 204$_1$, 204$_2$ may respectively have associated therewith a state name 206$_1$, 206$_2$ and a list of n tasks 208$_1$, 208$_2$, . . . , 208$_n$ to run while the state object 204$_1$, 204$_2$ is active. Transition criteria objects, such as transition criteria objects 210$_1$ and 210$_2$ enabling transition between a pair of state objects 204$_1$ and 204$_2$, may further be provided and evaluated by the FSM engine 128 to determine when the state machine 200 should switch from one state object, e.g. state object 204$_1$, to the next, e.g. state object 204$_2$.

The transition criteria objects 210$_1$, 210$_2$ illustratively each comprise a transition criterion implemented as a Boolean function or expression, which affects the behavior of the finite state machine 200. Actions or transitions may indeed only be enabled when the Boolean expression evaluates to true and such actions or transitions may be disabled when the Boolean expression evaluates to false. In particular, each Boolean expression may use a combination of Boolean operators, such as AND (&), OR (|), and NOT (!), to describe the criterion to be satisfied in order to transition from the state at the beginning of a transition line 212, e.g. state object $204_1$, to a state at the arrow head of the transition line 212, e.g. state object $204_2$. The use of such Boolean expressions as transition criteria provides added flexibility for configuring the finite state machine 200. Each transition criteria object $210_1$, $210_2$ may therefore be associated to a pair of state objects $204_1$, $204_2$ and hold a Boolean expression in post-fix notation, a state to transition from, e.g. state object $204_1$, and a state to transition to when the Boolean expression evaluates to true, e.g. state object $204_2$. A duration timer (not shown), which is indicative of the time delay to be lapsed prior to the transition criterion of the transition criteria object $210_1$, $210_2$ being evaluated, i.e. of the time a given state object $204_1$, $204_2$ is active, may further be provided in each state object $204_1$, $204_2$.

Figure 4A:
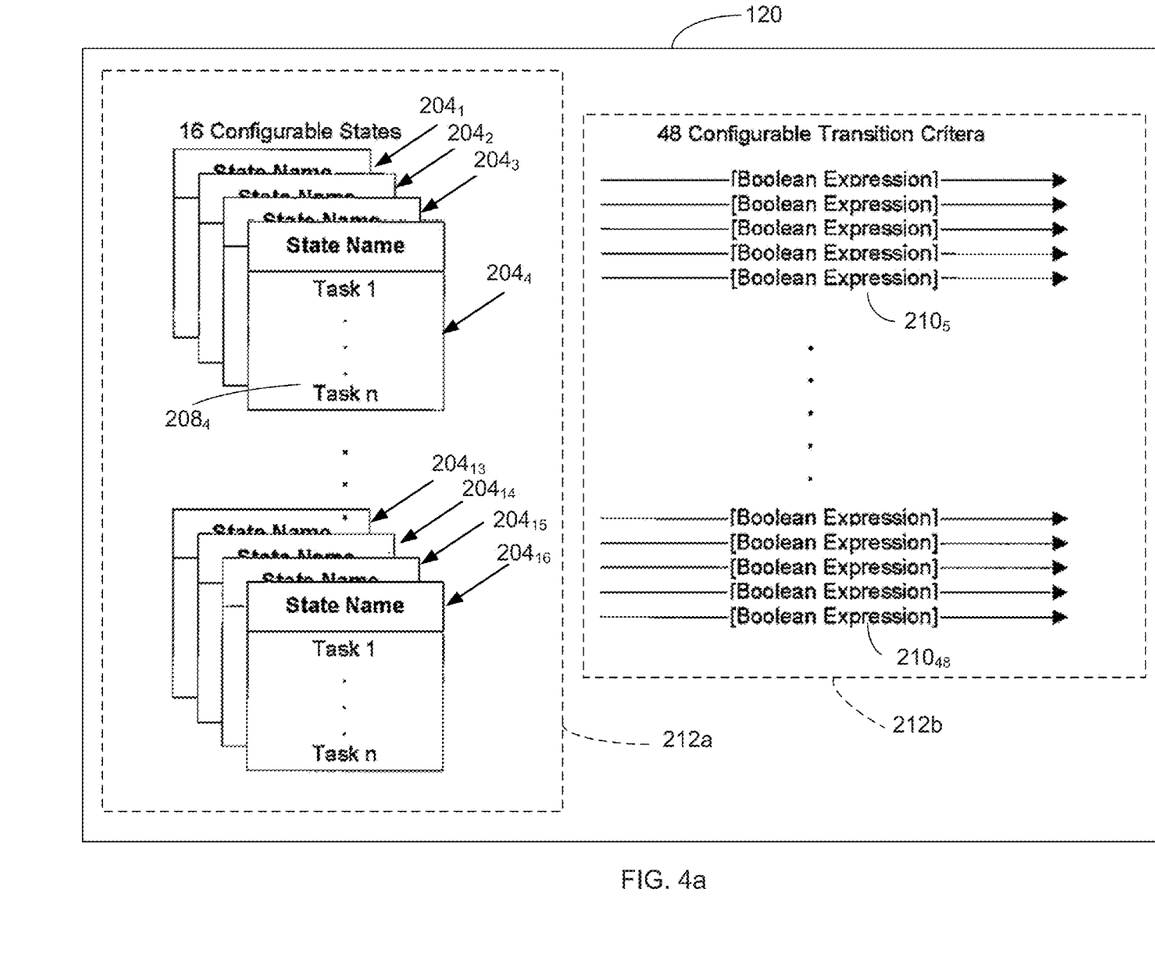
FIG. 4a is a schematic diagram of the data structures of the state diagram of FIG. 3.

Referring to FIG. 4a, the configuration memory 120 of the FAST box 18 illustratively receives from the ground server database 110 a given state machine configuration comprising an allocation between and a plurality of state objects, e.g. sixteen (16) state objects $204_1$, $204_2$, . . . , $204_{16}$, and a plurality of transition criteria objects, e.g. forty-eight (48) transition criteria objects $210_1$, $210_2$, . . . , $210_{48}$. It should however be understood that these numbers are solely exemplary and that a different number of state objects and transition criteria may be used. The number of state objects and transition criteria may be chosen to comply with a balance between flexibility and storage space. Depending on the finite state machine configuration to be achieved, any number, i.e. from 0 to 48, of the transition criteria objects $210_1$, $210_2$, . . . , $210_{48}$ in pool 212b may be allocated to a given state object $204_1$, $204_2$, . . . , $204_{16}$ in pool 212a. The state objects $204_1$, $204_2$, . . . , $204_{16}$ and transition criteria objects $210_1$, $210_2$, . . . , $210_{48}$ may therefore be combined in a variety of ways to achieve the desired configuration of the finite state machine 200. The plurality of state objects $204_1$, $204_2$, . . . , $204_{16}$ and transition criteria objects $210_1$, $210_2$, . . . , $210_{48}$ of the desired configuration of the finite state machine 200 may then be stored in separate pools or areas 212a, 212b of the configuration memory 120. The configuration resulting from the allocation between the state objects $204_1$, $204_2$, . . . , $204_{16}$ and transition criteria objects $210_1$, $210_2$, . . . , $210_{48}$ may then be run by the FSM engine 128 to achieve the desired software behavior of the FAST box 18.

Figure 4B:
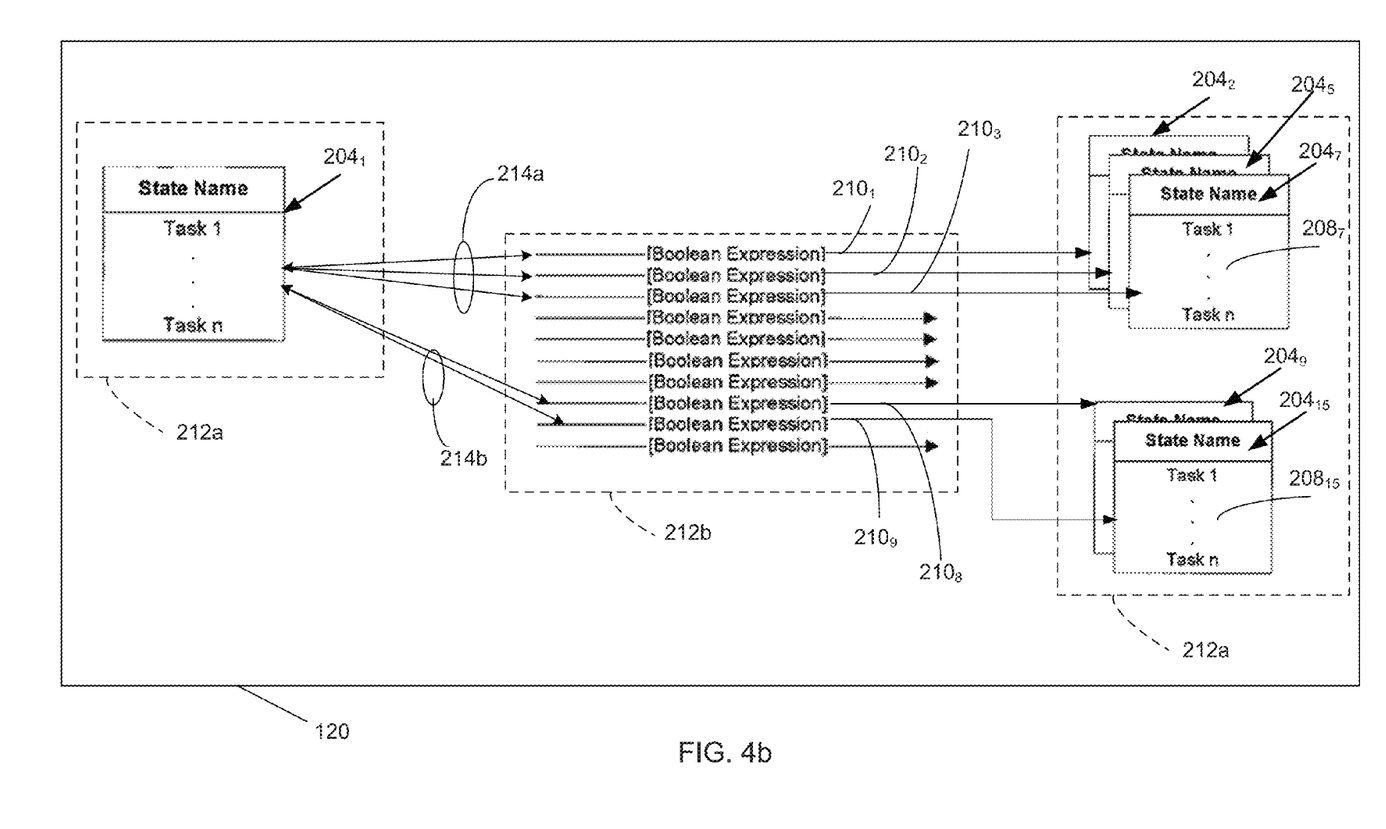

Referring to FIG. 4b, by changing the allocation between any one of the state objects $204_1$, $204_2$, . . . , $204_{16}$ and the transition criteria objects $210_1$, $210_2$, . . . , $210_{48}$, different functionalities may be obtained as different state objects $204_1$, $204_2$, . . . , $204_{16}$ may be active and transition among each other. As a result, different lists of tasks $208_1$, $208_2$, . . . , $208_n$, each list being illustratively associated with a given state object $204_1$, $204_2$, . . . , $204_{16}$ as discussed above, may be performed upon running the different configurations of the finite state machine 200. For example, a first allocation 214a between the state object $204_1$ and the transition criteria objects $210_1$, $210_2$, and $210_3$ may be defined in a first state machine configuration retrieved from the ground server database 110. The transition criteria objects $210_1$, $210_2$, and $210_3$ may in turn each comprise a transition criterion, which if satisfied, enables transition of state object $204_1$ to state objects $204_2$, $204_5$, and $204_7$. Thus, upon running the first state machine configuration, at least one of the lists of tasks associated with state objects $204_2$, $204_5$, and $204_7$, for example list $208_7$, may then be performed if at least one of the transition criteria of transition criteria objects $210_1$, $210_2$, and $210_3$ is satisfied. A second state machine configuration may then be defined, such that a second allocation 214b between the state object $204_1$ and the transition criteria objects $210_8$ and $210_9$ is made and transition is enabled from state object $204_1$ to state objects $204_9$ and $204_{15}$ when the appropriate transition criteria is met. At least one of the lists of tasks associated with state objects $204_9$ and $204_{15}$, for example list $208_{15}$, may then be performed upon running the second state machine configuration. Different functionalities may therefore be implemented in the FAST box 18.

In one embodiment, each one of the sixteen (16) state objects $204_1$, $204_2$, . . . , $204_{16}$ may be allocated a fixed number of transition criteria, namely an average of four (4) transition criteria out of the forty-eight (48) available transition criteria objects $210_1$, $210_2$, . . . , $210_{48}$. Alternatively, by providing the separate pools 212a and 212b, each state object $204_1$, $204_2$, . . . , $204_{16}$ may be provided with any number, e.g. up to forty-eight (48), of transition criteria objects $210_1$, $210_2$, . . . , $210_{48}$, and thus with any number, e.g. up to 48, of possible transitions towards the other state objects $204_1$, $204_2$, . . . , $204_{16}$, if needed to implement a desired software behavior. Accordingly, a great variety of configurations may be achieved and the flexibility of the finite state machine 200 may be significantly increased.

In addition to changing the allocation between the state objects $204_1$, $204_2$, . . . , $204_{16}$ and the transition criteria objects $210_1$, $210_2$, . . . , $210_{48}$, the base configuration of both the state objects $204_1$, $204_2$, . . . , $204_{16}$ and the transition criteria objects $210_1$, $210_2$, . . . , $210_{48}$ may further be reconfigured to modify the design to a new finite state machine. In particular, the state name $206_i$, task list $208_i$, and duration timer of each state object $204_i$, where i=1, 2, . . . 16 is the state object number, are illustratively configurable. Also, the Boolean expression of the transition criteria object $210_j$, state object $204_i$ to transition from, and state object $204_i$ to transition to, of each transition criteria object $210_j$, where j=1, 2, . . . 48 is the transition criteria object number, are also illustratively configurable. Such changes in the data structures of the finite state machine 200 may drive changes in the functions and applications implemented by the finite state machine 200. The software behaviour of the FAST box 18 may in turn be modified. For example, the list $208_4$ of tasks executed by the state object $204_4$ may be modified by the operator to change the sequence of events executed by the FAST box 18 when the state object $204_4$ is active. Changes to the software behaviour of the FAST box 18 may therefore be accommodated without changing the certified software stored in the configuration memory 120.

As discussed above, the state objects $204_1$, $204_2$, . . . , $204_{16}$ and the transition criteria objects $210_1$, $210_2$, . . . , $210_{48}$ of the finite state machine 200 may be changed remotely by an operator via the computer terminal 108. The new configuration of the finite state machine 200 resulting from the changes may subsequently be stored to the database 110. The database 110 may then be accessed over the wireless network 106 by the FAST box 18 for downloading the new configuration of the state machine 200 in the configuration memory 120. In order to detect corruption during transmission and enforce version control so that inadvertent changes may not be loaded into the FAST box 18, modifications to the state objects 204 and transition criteria objects 210 may further be protected with a software checksum.

Figure 5:
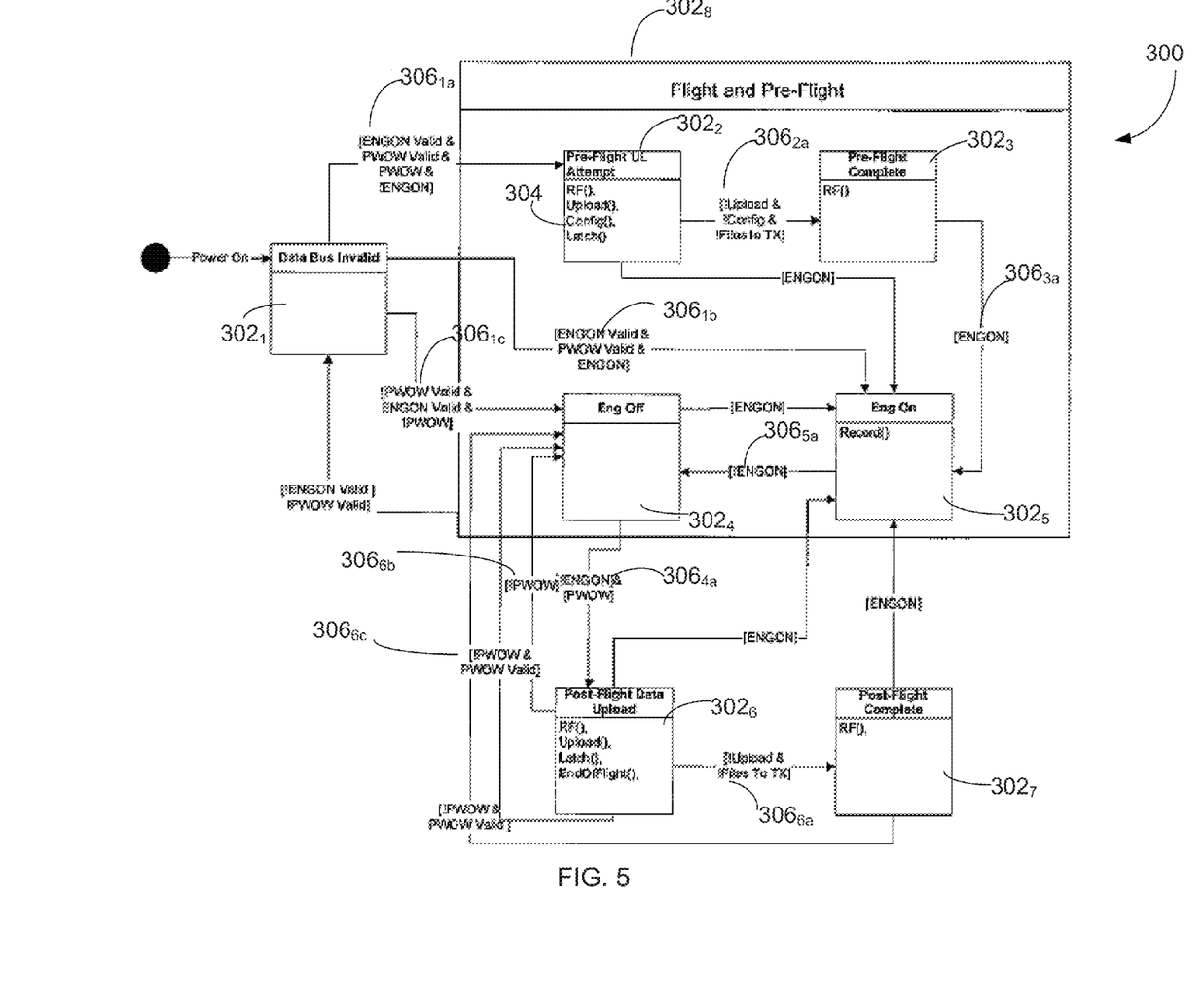
FIG. 5 is an illustrative implementation of the state diagram of FIG. 3.

Referring to FIG. 5, an illustrative configuration 300 of the base finite state machine 200 will now be described. The finite state machine 300 illustratively comprises seven state objects $302_1$, $302_2$, $302_3$, $302_4$, $302_5$, $302_6$, and $302_7$, each comprising a list of tasks 304 that may run during each phase of flight. State objects $302_2$, $302_3$, $302_4$, and $302_5$ are illustratively combined into a super-state object $302_8$. Inputs to the finite state machine 300 illustratively comprise the aircraft data signals, which are received at the control processor 118 through the AC data bus 126 and decoded by the control processor 118. The decoded signals may then be assigned a binary bit, illustratively 1 if the signal is true or 0 if the signal is false, and combined into a binary transition condition using Boolean operators AND (&), OR (|), and NOT (!). For example, the data signals may comprise, but are not limited to, a Processed Weight on Wheels (PWOW), which indicates whether the aircraft 10 is on the ground (PWOW true, also noted PWOW) or not (PWOW false, also noted !PWOW). An Engine On (ENGON) input may also indicate whether the engine 12 is turned on (ENGON true, or ENGON) or off (ENGON false, or !ENGON). As the inputs may only be considered valid if they are received at the control processor 118, additional Engine On Trigger Valid (ENGON Valid) and Processed WOW valid (PWOW Valid) signals may further be used to describe the inputs by indicating whether the received aircraft data signals are valid (Valid signal true) or not (Valid signal false, also noted !ENGON Valid or !PWOW Valid).

Upon powering up of the system, the finite state machine 300 illustratively moves to the Data Bus Invalid state $302_1$ where it waits for inputs PWOW and ENGON to become valid, i.e. to be received at the control processor 118. Once the inputs are valid, three possible transitions are illustratively available from state object $302_1$ to state objects $302_2$, $302_4$, and $302_5$. In order to determine which one of the state objects $302_2$, $302_4$, or $302_5$ the state object $302_1$ may transition to, each one of the transition criteria objects $306_{1a}$, $306_{1b}$, and $306_{1c}$ may be evaluated. The first transition criteria $306_{1a}$ to be satisfied to transition to the Pre-Flight UL Attempt state object $302_2$ is for the PWOW and ENGON signals to be valid, the PWOW signal to be true, and the ENGON signal to be false, meaning that the aircraft 10 is on the ground and the engine 12 is off. If this is the case the state machine 300 may move to state object $302_2$ where the FAST box 18 may be caused to attempt to execute the RF( ) task to turn on an RF modem (not shown), execute the Upload( ) task to initiate the process of uploading aircraft data through the wireless connection 102 using the RF modem, execute the Config( ) task to check with the ground server 22 whether a new finite state machine configuration is available for upload, and execute the Latch( ) task to use power from a battery (not shown) to upload the data. The next transition criteria $306_{1b}$ to be satisfied to transition to the Eng On state object $302_5$ is for the ENGON and PWOW signals to be valid and the ENGON signal to be true, meaning that the engine 12 is already on. If this is the case, the state machine 300 may move to state object $302_5$ where the state machine 300 may cause the FAST box 18 to start recording engine data upon execution of the Record( ) task.

The state object $302_1$ may also transition to the Eng Off state object $302_4$ if the transition criteria $306_{1c}$ is satisfied, namely that the PWOW and ENGON signals are valid and the PWOW signal is false, meaning that the aircraft 10 is not on the ground but in flight. In the Eng Off state $302_4$, the finite state machine 300 illustratively does not cause the FAST box 18 to perform any action.

It should be understood that although three transition criteria object $306_{1a}$, $302_{1b}$, and $302_{1c}$ are illustrated as being available for transitioning from state $302_1$, the configuration of the finite state machine 300 may be modified by specifying a plurality of other transition criteria to allow additional transitions between the state objects $302_1$, $302_2$, $302_3$, $302_4$, $302_5$, $302_6$, and $302_7$. This may in turn provide additional functionality to the behavior implemented by the FAST box 18 Also, the configuration of the finite state machine 300, and accordingly the functionality of the FAST box 18, may be modified by adding tasks to any one of the state objects $302_1$, $302_2$, $302_3$, $302_4$, $302_5$, $302_6$, and $302_7$ or modifying the present list of tasks as in 304.

If data has been uploaded pre-flight, the Pre-Flight UL Attempt state object $302_2$ may then transition to the Pre-Flight Complete object $302_3$ upon satisfying transition criteria $306_{2a}$, which specifies that no more data is to be uploaded (!Files to TX), no new configuration is to be uploaded (!Config), and the FAST box 18 is done uploading (!Upload), is satisfied. The finite state machine 300 may then transition to the Eng On state object $302_5$, if transition criteria $306_{3a}$ is satisfied, namely if ENGON is true, i.e. the engine 12 is on. When the state object $302_5$ is active, the aircraft 10 is illustratively in flight. At the end of the flight, the finite state machine 300 may then transition to the Eng Off state object $302_4$ if the only transition criteria $306_{5a}$ associated with state object $302_5$ is satisfied, namely if the engine 12 is turned off (!ENGON). Once the engine 12 is off, and the aircraft 10 is on the ground, i.e. when the transition criteria $306_{4a}$ stating that ENGON is false and PWOW is true, is satisfied, the finite state machine 300 may transition to the Post-Flight Data Upload state object $302_6$. In the Post-Flight Data Upload state $302_6$, the finite state machine 300 may then cause the FAST box 18 to execute tasks RF( ), Upload( ), Latch( ), and EndOfFlight( ) in order to upload data as well as organize the received flight-specific data. The Post-Flight Data Upload state object $302_6$ may finally transition to the Post-Flight Complete state object $302_7$ if the transition criteria $306_{6a}$ is satisfied, i.e. the system has no more data to upload and the uploading process is complete (!Files to TX & !Upload). In the Post-Flight Complete state $302_7$, the finite state machine 300 may cause the FAST box 18 to execute task RF( ) in order to turn the RF modem on post flight.

Additional transition criteria between the state objects $302_1$, $302_2$, $302_3$, $302_4$, $302_5$, $302_6$, and $302_7$ may be provided. For instance, transitions from the Pre-Flight UL Attempt state object $302_2$, the Eng Off state object $302_4$, the Post-Flight Data Upload state object $302_6$, and the Post-Flight Complete state object $302_7$ to the Eng On state object $302_5$ may occur if the engine 12 is turned on (ENGON true), are satisfied.

Additional transitions may also occur from the Post-Flight Data Upload state object $302_6$ to the Eng Off state object $302_4$ if transition criteria $306_{6b}$ and $306_{6c}$, which respectively specify that PWOW is false (!PWOW), PWOW is false and PWOW is valid, are satisfied. The configuration of the finite state machine 300 thus enables a single state object, such as the state object $302_6$, to transition to the same state object, such as the object $302_4$, when different transition criteria, as in $306_{6b}$ and $306_{6c}$, are satisfied. Flexibility of the design is therefore increased.

In addition, a transition may occur from the Post-Flight Complete state object $302_7$ to the Eng Off state object $302_4$ if PWOW is false (!PWOW) and PWOW is valid, is satisfied. The configuration of the finite state machine 300 thus further enables different state objects, such as the state objects $302_6$ and $302_7$, to transition to the same state object, such as the state object $302_4$, when a same Boolean expression, e.g. !PWOW & PWOW Valid, is satisfied.

Also, any one of the state objects $302_2$, $302_3$, $302_4$, and $302_5$ of the super-state object $302_8$ may transition to the Data Bus Invalid state object $302_1$ if any one of the ENGON Valid is false OR PWOW Valid is false, meaning that no aircraft data has been received at the control processor 118.

Figure 6A:
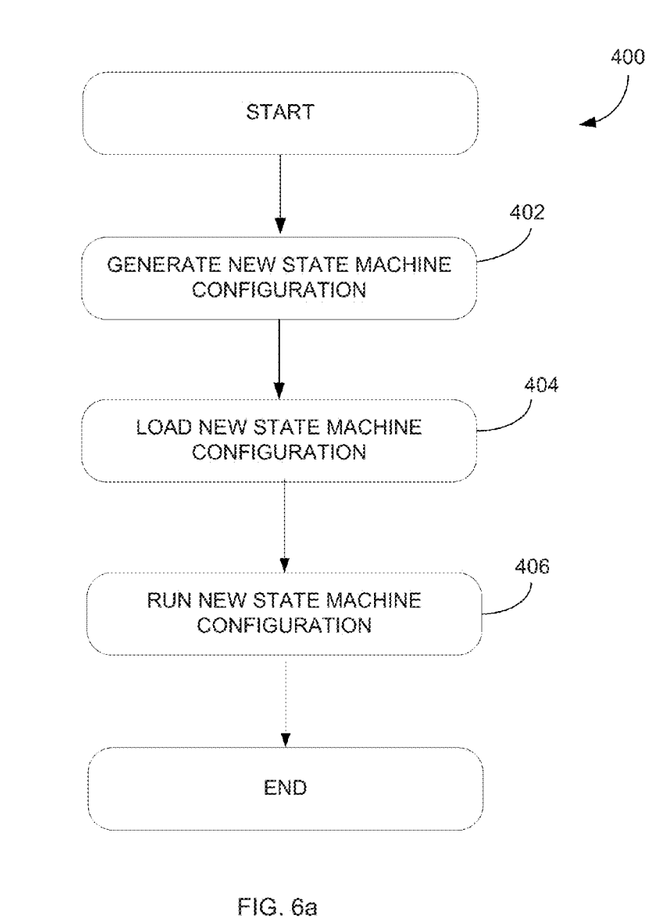
FIG. 6a is a flowchart of a remotely configurable data acquisition and/or transmission method in accordance with an illustrative embodiment.

Referring to FIG. 6a, a remotely configurable data acquisition and/or transmission method 400 will now be described. The method 400 illustratively comprises generating a new state machine configuration at step 402, loading the new state machine configuration at step 404, and running the new state machine configuration at step 406.

Figure 6B:
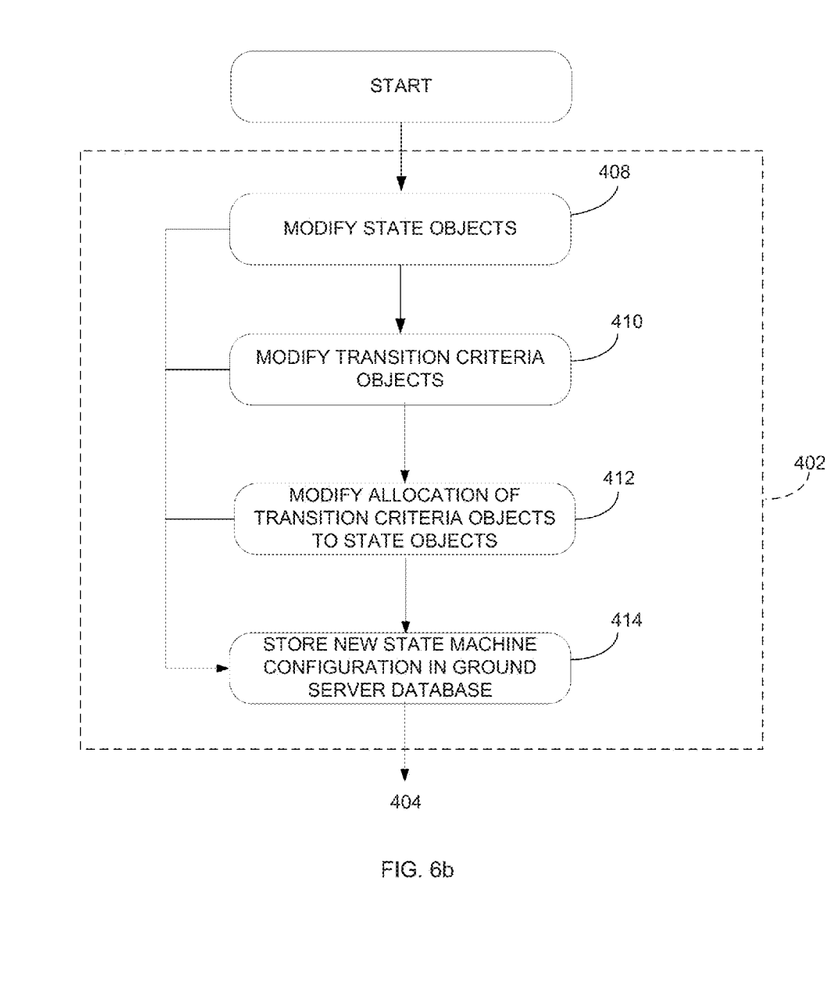
FIG. 6b is a flowchart of the step of FIG. 6a of generating a new state machine configuration.

Referring to FIG. 6b, the step 402 of generating a new state machine configuration may comprise at least one of modifying at step 408 the state objects, such as state objects $204_1$ and $204_2$ of FIG. 3, modifying at step 410 the transition criteria objects, such as transition criteria objects $210_1$ and $212_2$ of FIG. 3, and modifying at step 412 an allocation between the transition criteria objects $210_1$ and $212_2$ and the state objects $204_1$ and $204_2$, as discussed above. The thus created new state machine configuration may then be stored at step 414 in the database 110 coupled to the ground server 22 for subsequent retrieval by the FAST box 18.

Figure 6C:
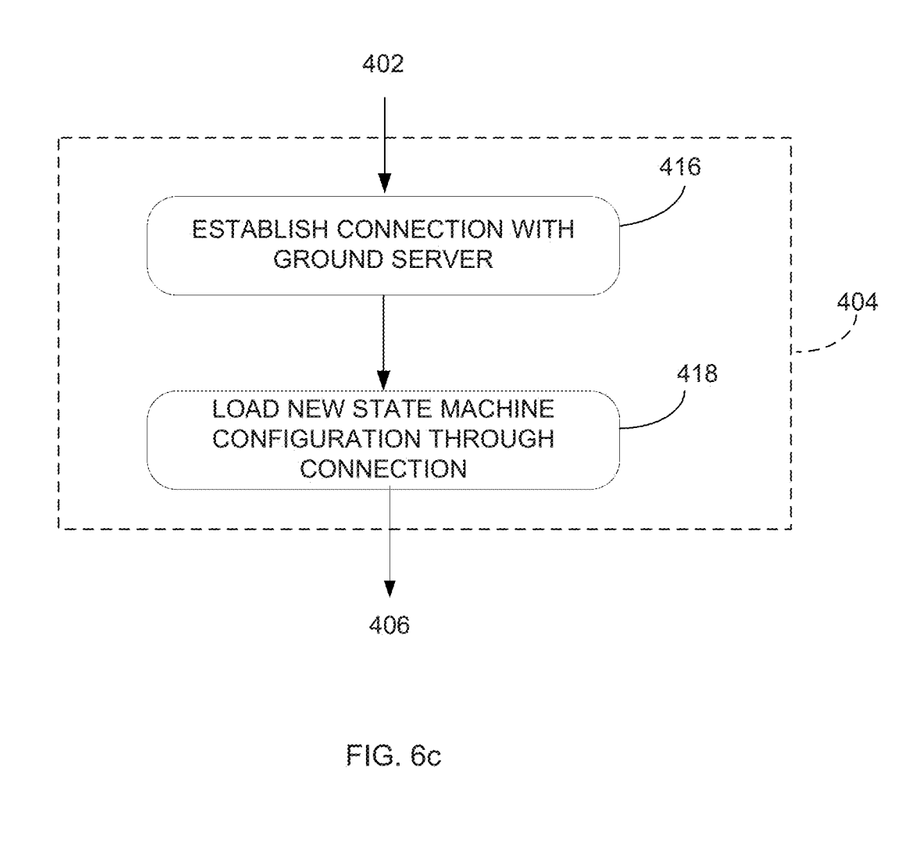
FIG. 6c is a flowchart of the step of FIG. 6a of loading a new state machine configuration.

Referring to FIG. 6c, the step 404 of loading the state machine configuration may comprise establishing at step 416 a connection, such as the wireless connection 102 of FIG. 2, with the ground server 22 and loading at step 418 the new state machine configuration from the database 110 into the FAST box 18 through the established connection.

Referring back to FIG. 3, the base state machine 200 illustratively enables option-selectable software behavior to be implemented in the FAST box 18, thus minimizing instances where reprogramming the FAST box 18 would be necessary. Moreover, multiple versions of software may be replaced with a single version that may be configured by changing the configuration of the base state machine 200. Also, as discussed above, this configuration may be remotely changed over the wireless connection 104 without having to change the certified software in the FAST box 18 or dispatching personnel to the aircraft 10 to update the FAST box 18. As a result, the time and effort expanded to adapt the FAST box 18 to a new aircraft 10 may be reduced.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An aircraft data acquisition and transmission system comprising: a memory having stored therein a first state machine configuration comprising a first allocation between a plurality of transition criteria objects stored in a first area of the memory and a plurality of state objects stored in a second area of the memory separate from the first area, the transition criteria objects and the state objects corresponding to aircraft-certified components; a processor coupled to the memory; and at least one aircraft-certified application executable by the processor for: causing a first data acquisition and/or transmission behavior in the aircraft by running the first state machine configuration; receiving a second state machine configuration comprising a second allocation between the plurality of transition criteria objects and the plurality of state objects, the second state machine configuration modifying a software behavior of the system and certification of the application and the components being unaffected by the modified software behavior; and causing a second data acquisition and/or transmission behavior in the aircraft by running the second state machine configuration.

2. The system of claim 1, wherein the at least one aircraft-certified application is executable by the processor for replacing in the memory the first state machine configuration with the second state machine configuration.

3. The system of claim 2, wherein running the first state machine configuration comprises retrieving a first state data structure of each one of a first number of state objects, and a first transition data structure of each one of a first number of transition criteria objects.

4. The system of claim 3, wherein running the second state machine configuration comprises retrieving a second state data structure of each one of the first number of state objects, and a second transition data structure of each one of the first number of transition criteria objects.

5. The system of claim 2, wherein running the second state machine configuration comprises retrieving a second state data structure of each one of a second number of state objects, and a second transition data structure of each one of a second number of transition criteria objects.

6. The system of claim 4, wherein retrieving the first state data structure comprises retrieving a first state name, a first list of tasks to be performed when the one of the first number of state objects is active, and a first timer indicative of a first duration for which the one of the first number of state objects is active and wherein retrieving the second state data structure comprises retrieving at least one of a second state name, a second list of tasks performed when the one of the first number of state objects is active, and a second timer indicative of a second duration for which the one of the first number of state objects is active.

7. The system of claim 3, wherein retrieving the first transition data structure comprises retrieving a Boolean function of a plurality of aircraft signals.

8. The system of claim 1, wherein the at least one aircraft-certified application is executable by the processor for establishing a wireless connection to a remote server and receiving through the connection the second allocation between the plurality of transition criteria objects and the plurality of state objects.

9. The system of claim 1, wherein running the first state machine configuration comprises causing a pre-flight data acquisition and/or transmission behavior and running the second state machine configuration comprises causing at least one of an in-flight and a post-flight acquisition and/or transmission behavior.

10. A non-transitory computer-implemented method for aircraft data recording and transmission, the method comprising executing, on a processor of an aircraft computer, aircraft-certified program code for: retrieving from a memory a first state machine configuration comprising a first allocation between a plurality of transition criteria objects stored in a first area of the memory and a plurality of state objects stored in a second area of the memory separate from the first area, the transition criteria objects and the state objects corresponding to aircraft-certified components; causing a first data acquisition and/or transmission behavior in the aircraft by running the first state machine configuration; receiving a second state machine configuration comprising a second allocation between the plurality of transition criteria objects and the plurality of state objects, the second state machine configuration modifying a software behavior of the processor and certification of the application and the components being unaffected by the modified software behavior; and causing a second data acquisition and/or transmission behavior in the aircraft by running the second state machine configuration.

11. The method of claim 10, further comprising replacing in the memory the first state machine configuration with the second state machine configuration.

12. The method of claim 10, wherein running the first state machine configuration comprises retrieving a first state data structure of each one of a first number of state objects, and a first transition data structure of each one of a first number of transition criteria objects.

13. The method of claim 12, wherein running the second state machine configuration comprises retrieving a second state data structure of each one of the first number of state objects, and a second transition data structure of each one of the first number of transition criteria objects.

14. The method of claim 12, wherein running the second state machine configuration comprises retrieving a second state data structure of each one of a second number of state objects, and a second transition data structure of each one of a second number of transition criteria objects.

15. The system of claim 13, wherein retrieving the first state data structure comprises retrieving a first state name, a first list of tasks to be performed when the one of the first number of state objects is active, and a first timer indicative of a first duration for which the one of the first number of state objects is active and wherein retrieving the second state data structure comprises retrieving at least one of a second state name, a second list of tasks performed when the one of the first number of state objects is active, and a second timer indicative of a second duration for which the one of the first number of state objects is active.

16. The system of claim 12, wherein retrieving the first transition data structure comprises retrieving a Boolean function of a plurality of aircraft signals.

17. The method of claim 10, further comprising establishing a wireless connection to a remote server and receiving through the connection the second allocation between the plurality of transition criteria objects and the plurality of state objects.

18. The method of claim 10, wherein running the first state machine configuration comprises causing a pre-flight data acquisition and/or transmission behavior and running the second state machine configuration comprises causing at least one of an in-flight and a post-flight acquisition and/or transmission behavior.

19. A non-transitory computer readable medium having stored thereon aircraft-certified program code executable by a processor of an aircraft computer, for recording and transmitting aircraft data, the aircraft-certified program code executable for: retrieving from a memory a first state machine configuration comprising a first allocation between a plurality of transition criteria objects stored in a first area of the memory and a plurality of state objects stored in a second area of the memory separate from the first area, the transition criteria objects and the state objects corresponding to aircraft-certified components; causing a first data acquisition and/or transmission behavior in the aircraft by running the first state machine configuration; receiving a second state machine configuration comprising a second allocation between the plurality of transition criteria objects and the plurality of state objects, the second state machine configuration modifying a software behavior of the processor and certification of the application and the components being unaffected by the modified software behavior; and causing a second data acquisition and/or transmission behavior in the aircraft by running the second state machine configuration.

* * * * *